United States Patent
Sakai et al.

(10) Patent No.: US 11,295,489 B2
(45) Date of Patent: Apr. 5, 2022

(54) INFORMATION PRESENTATION DEVICE, INFORMATION PRESENTATION METHOD AND STORAGE MEDIUM

(71) Applicants: Kabushiki Kaisha Toshiba, Minato-ku (JP); Toshiba Digital Solutions Corporation, Kawasaki (JP)

(72) Inventors: Saki Sakai, Yokohama (JP); Yeonsoo Yang, Machida (JP); Masanori Tajima, Kawasaki (JP); Hirotaka Ueki, Yokohama (JP); Ai Matsui, Yokohama (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 16/579,388

(22) Filed: Sep. 23, 2019

(65) Prior Publication Data

US 2020/0020141 A1  Jan. 16, 2020

Related U.S. Application Data

(63) Continuation of application No. PCT/JP2017/034698, filed on Sep. 26, 2017.

(30) Foreign Application Priority Data

Mar. 24, 2017 (JP) .............................. JP2017-059027

(51) Int. Cl.
*G06F 30/23* (2020.01)
*G06T 11/20* (2006.01)
*G06T 7/564* (2017.01)

(52) U.S. Cl.
CPC ............ *G06T 11/203* (2013.01); *G06F 30/23* (2020.01); *G06T 7/564* (2017.01)

(58) Field of Classification Search
CPC ........ G06T 11/203; G06T 7/564; G06F 30/23
(Continued)

(56) References Cited

U.S. PATENT DOCUMENTS

2005/0264571 A1  12/2005  Stamm et al.
2006/0290695 A1* 12/2006  Salomie ................. G06T 17/20
                                                         345/420

(Continued)

FOREIGN PATENT DOCUMENTS

EP    1 600 895 A1    11/2005
JP      5-6402 A        1/1993
(Continued)

OTHER PUBLICATIONS

International Search Report dated Dec. 19, 2017 in PCT/JP2017/034698, filed Sep. 26, 2017 (with English translation).

*Primary Examiner* — Jin Ge
(74) *Attorney, Agent, or Firm* — Oblon, McClelland, Maier & Neustadt, L.L.P.

(57) ABSTRACT

An information presentation device according to an embodiment includes a contour extraction unit, an abstraction processing unit, and a contour correction unit. The contour extraction unit extracts a contour of each structural object included in data showing a layout of a plurality of structural objects. The abstraction processing unit abstracts a contour of each structural object extracted by the contour extraction unit and draws the abstracted contour on a plane grid surface in which grid lines in two directions orthogonal to each other are drawn. The contour correction unit corrects, among contour lines to constitute a contour abstracted by the abstraction processing unit, a contour line deviating from both of the grid lines in the two directions so as to match a grid line in at least one direction of the grid lines in the two directions.

6 Claims, 12 Drawing Sheets

(58) Field of Classification Search
 USPC .......................................................... 345/442
 See application file for complete search history.

(56) References Cited

U.S. PATENT DOCUMENTS

| | | | |
|---|---|---|---|
| 2007/0014488 A1* | 1/2007 | Chen .................... | G06K 9/0063 382/294 |
| 2007/0101310 A1* | 5/2007 | Stirniman ............... | G03F 7/705 716/53 |
| 2008/0079443 A1 | 4/2008 | Nishino et al. | |
| 2011/0280453 A1* | 11/2011 | Chen ......................... | G06T 7/75 382/113 |

FOREIGN PATENT DOCUMENTS

| | | | |
|---|---|---|---|
| JP | 2000-181343 A | 6/2000 | |
| JP | 2006-18811 A | 1/2006 | |
| WO | WO 2006/103741 A1 | 10/2006 | |

* cited by examiner

| ID | EXTRACTED COORDINATES | AREA | AREA RATIO |
|---|---|---|---|
| 1 | (0,0)(X1,Y1)··· | SA1 | RS1 |
| 2 | (X1,Y1)(X2,Y2)··· | SA2 | RS2 |
| | | | |

| ID | EXTRACTED COORDINATES | ABSTRACTED COORDINATES | AREA | AREA RATIO |
|---|---|---|---|---|
| 1 | (0,0) (X1,0) ··· | (0,0) (Xa,0) ··· | SA1 | RS1 |
| 2 | (X2,Y2)(X2,Y3)··· | (Xb,Yb)(Xb,Yc)··· | SA2 | RS2 |
| | | | | |

| ID | ABSTRACTED COORDINATES | AREA RATIO |
|---|---|---|
| Q | (Xd,Yd)(Xe,Yd)··· | 4 |
| R | (Xd,Yd)(Xe,Yd)··· | 1 |

| ID | EXTRACTED COORDINATES | ABSTRACTED COORDINATES | COMPLEMENTED COORDINATES | AREA | AREA RATIO |
|---|---|---|---|---|---|
| 1 | (0,0) (X1,0) ··· | (0,0) (Xa,0) ··· | — | SA1 | RS1 |
| 2 | (X2,Y2)(X2,Y3)··· | (Xb,Yb)(Xb,Yc)··· | — | SA2 | RS2 |
| Q | (X5,Y5)(X6,Y5)··· | (Xd,Yd)(Xe,Yd)··· | (Xd,Yd)(Xf,Yd)··· | SAQ | 4 |
| R | (X6,Y5)(X7,Y5)··· | (Xd,Yd)(Xe,Yd)··· | (Xf,Yd)(Xe,Yd)··· | SAR | 1 |

INFORMATION PRESENTATION DEVICE, INFORMATION PRESENTATION METHOD AND STORAGE MEDIUM

CROSS REFERENCE TO RELATED APPLICATIONS

This application is a continuation application of PCT/JP2017/034698 filed on Sep. 26, 2017 and claims benefit of Japanese Application No. 2017-059027 filed in Japan on Mar. 24, 2017, the entire contents of which are incorporated herein by this reference.

FIELD

An embodiment described herein relates to an information presentation device, an information presentation method and a storage medium.

BACKGROUND

A method has been used to virtually reproduce a situation in a physical plant on a computer. The virtual reproduction of a physical plant is generally called "Digital Twin". In software that can virtually reproduce a situation in an actual plant on a computer, a UI (user interface) in which the shape of each facility in the plant is abstracted (simplified) may be adopted to suppress development costs.

However, facilities having a shape and/or a size that results in having reduced visibility and complicated vision due to abstraction (simplification) are installed in an actual plant in some cases.

BRIEF DESCRIPTION OF THE DRAWINGS

FIG. 4 is a diagram to explain an example of list data obtained from the processes carried out in the information presentation device according to the embodiment;

FIG. 5 is a diagram to explain an example of list data obtained by the processes carried out in the information presentation device according to the embodiment;

FIG. 12 is a diagram to explain an example of list data obtained by the processes carried out in the information presentation device according to the embodiment;

FIG. 13 is a diagram to explain an example of list data obtained by the processes carried out in the information presentation device according to the embodiment;

DETAILED DESCRIPTION

An embodiment aims at providing an information presentation device, an information presentation method and a storage medium to enable prevention of visibility reduction and complicated vision in abstracting (simplifying) and presenting a shape and contour of structural object.

The information presentation device according to the embodiment includes a contour extraction unit, an abstraction processing unit and a contour correction unit. The contour extraction unit extracts a contour of each structural object included in data showing a layout of a plurality of structural objects. The abstraction processing unit abstracts a contour of each structural object extracted by the contour extraction unit, and draws the abstracted contour on a plane grid surface in which grid lines in two directions orthogonal to each other are drawn. The contour correction unit corrects, among contour lines to constitute a contour abstracted by the abstraction processing unit, a contour line deviating from both of the grid lines in the two directions so as to be aligned with a grid line in at least one direction of the grid lines in the two directions.

The embodiment is explained below with reference to the drawings.

Figure 1:
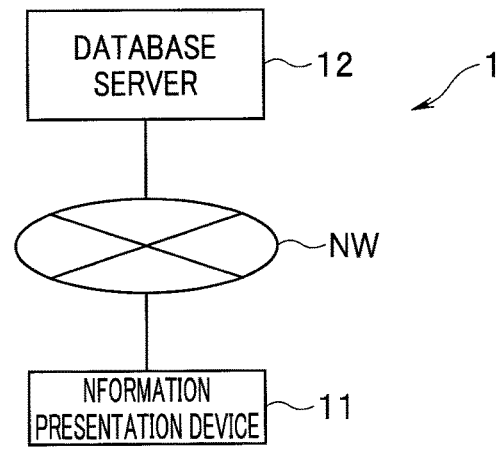
FIG. 1 shows an example of a configuration of an information presentation system including an information presentation device according to an embodiment.

An information presentation system 1 is composed of, as shown in FIG. 1, an information presentation device 11 that is a personal computer, etc. operated by a user, and a data base server 12 that is connected to the information presentation device 11 via a network NW. FIG. 1 shows an example of a configuration of the information presentation system according to the embodiment.

Figure 2:
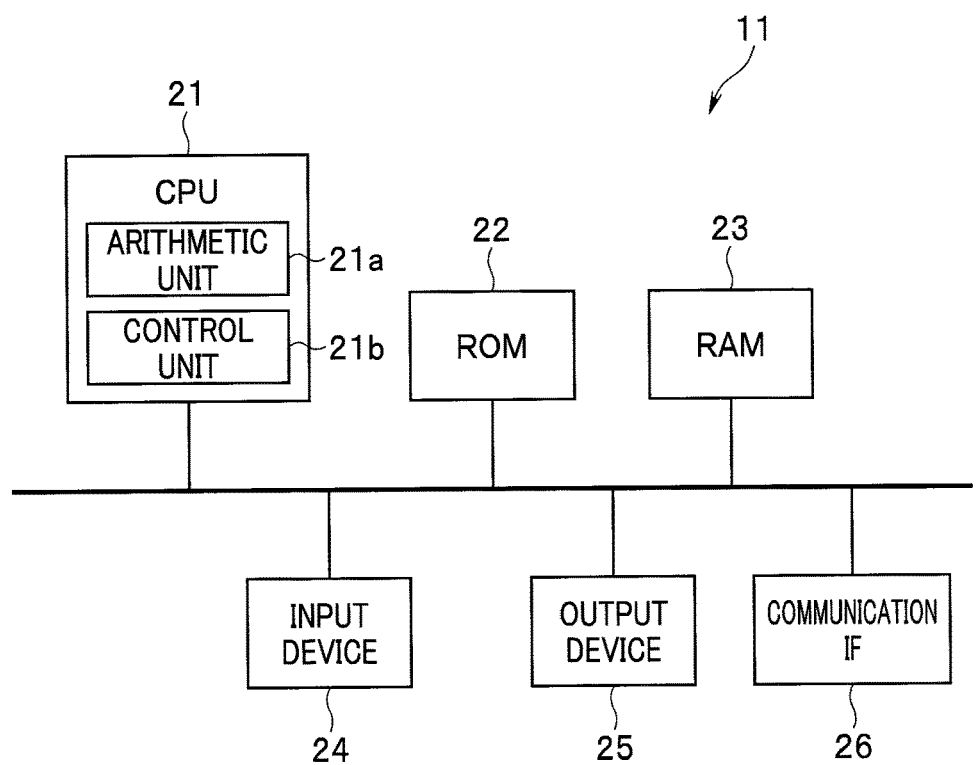
FIG. 2 shows an example of a configuration of the information presentation device according to the embodiment.

The information presentation device 11 is composed of, for example, a CPU 21, a ROM (read only memory) 22, a RAM (random access memory) 23, an input device 24, an output device 25, and a communication IF (interface) 26 as shown in FIG. 2.

The CPU 21 comprises an arithmetic unit 21a configured to perform a drawing process and other processes based on a program, etc. stored in the ROM 22 and using the RAM 23 as a working area. The CPU 21 also comprises a control unit 21b configured to control operations of respective units of the information presentation device 11 based on information and instructions, etc. inputted according to an operation of the input device 24.

The input device 24 is configured to be able to receive information and instructions, etc. according to an operation by a user. More specifically, the input device 24 comprises at least one of, for example, a keyboard, a mouse and a touch panel.

The output device 25 is configured to be able to externally output information generated according to processing, etc. by the CPU 21. More specifically, the output device 25 comprises, for example, a display or a printer.

The communication IF 26 is composed of a device that can transmit and receive data, etc. to/from the data base server 12 via the network NW.

The data base server 12 stores therein drawing image data showing a layout of a plurality of structural objects existing in a facility. More specifically, the data base server 12 stores therein drawing image data showing, for example, a layout of a plurality of facilities existing in a plant.

Figure 3:
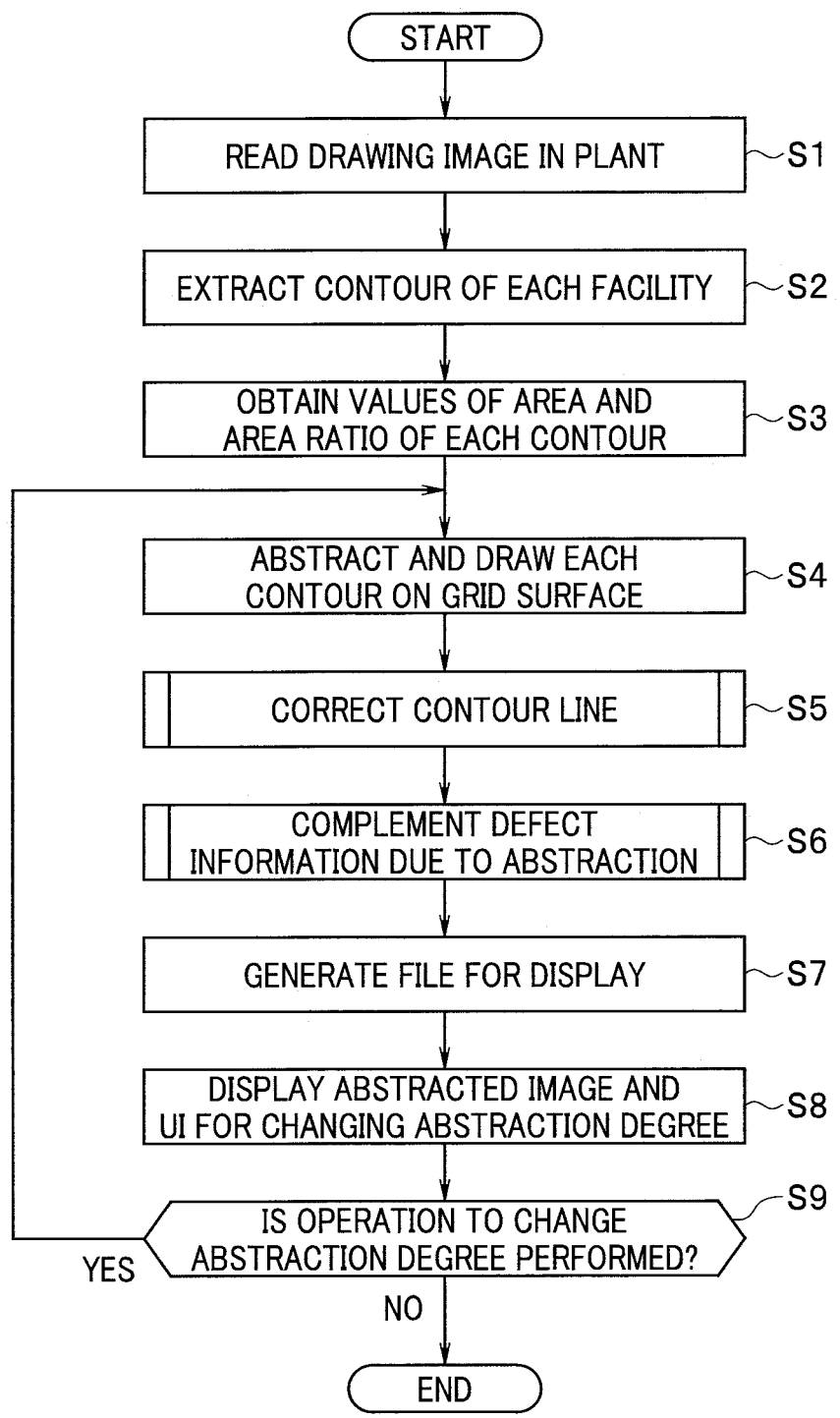
FIG. 3 is a flowchart showing a specific example of processes carried out in the information presentation device according to the embodiment.

Next, a specific example of processes according to the embodiment is explained with reference to FIG. 3, etc. Note that the following explanation is based on a case example where major processes according to the embodiment are performed by the CPU 21. The following explanation is also based on a case example where the output device 25 is a display. FIG. 3 is a flowchart showing a specific example of processes carried out in the information presentation device according to the embodiment.

The arithmetic unit 21a performs processes to read drawing image data from the data base server 12 via the network NW (step S1 in FIG. 3) and to extract contours of each facility included in the read drawing image data (step S2 in FIG. 3). Namely, the arithmetic unit 21a having a function as a contour extraction unit reads drawing image data showing a layout of a plurality of structural objects from the data base server 12 and extracts a contour of each structural object included in the read drawing image data.

The arithmetic unit 21a performs a process to obtain values of an area and an area ratio of each contour extracted by the process at step S2 in FIG. 3 (step S3 in FIG. 3). More specifically, the arithmetic unit 21a obtains, for example, an area from the number of pixels included in the contour extracted by the process at step S2 in FIG. 3. The arithmetic unit 21a also obtains, in a state, as an example, where an area ratio of one contour having the minimum area among all the contours extracted by the process at step S2 in FIG. 3 is set to 1 as a reference value, area ratios of contours other than the one contour.

The arithmetic unit 21a generates and obtains, for example, list data T as shown in FIG. 4 based on a result of the processes at step S2 and step S3 in FIG. 3. FIG. 4 is a diagram to explain an example of list data obtained by the process carried out in the information presentation device according to the embodiment.

An item "ID" in the list data T1 shows an ID number that is a unique number given to each one of the contours extracted by the process at step S2 in FIG. 3. An item "extracted coordinates" in the list data T1 shows coordinate positions of a plurality of contour points corresponding to vertexes of a figure (polygon) formed by a contour extracted by the process at step S2 in FIG. 3. An item "area" in the list data T1 shows an area of a contour obtained by the process at step S3 in FIG. 3. An item "area ratio" in the list data T1 shows an area ratio of a contour obtained by the process at step S3 in FIG. 3.

In other words, the list data T1 exemplified in FIG. 4 is composed of data that can specify, for each contour, coordinate positions of contour points, an area and an area ratio obtained as a result of the processes at step S2 and step S3 in FIG. 3.

The arithmetic unit 21a performs a process, based on coordinate positions of contour points, an area and an area ratio included in the list data T1, to abstract each contour extracted by the process at step S2 in FIG. 3 and draw each contour on a grid surface (step S4 in FIG. 3).

Note that the present embodiment is explained based on the assumption that a grid surface is a plane in which a plurality of grid lines for dividing an area having a predetermined size beyond an image size of drawing image data read by the process at step S1 in FIG. 3 into a lattice are drawn vertically and laterally in the area. The present embodiment is also explained based on the assumption that a point of an intersection made by grid lines in two directions orthogonal to each other (in the vertical direction and the lateral direction) on a grid surface is a grid point. Further, the present embodiment is explained based on the assumption that an interval of grid lines adjacent to each other on a grid surface or an interval of grid points adjacent to each other on a grid surface is a grid width.

In other words, the arithmetic unit 21a having a function as an abstraction processing unit abstracts a contour of each structural object extracted by the process at step S2 in FIG. 3, and draws the abstracted contour on a grid surface in which grid lines in two directions orthogonal to each other are drawn.

The arithmetic unit 21a obtains, based on the list data T1 and a result of the process at step S4 in FIG. 3, for example, list data T2 as shown in FIG. 5. FIG. 5 is a diagram to explain an example of the list data obtained by processes carried out in the information presentation device according to the embodiment.

The list data T2 is configured as data containing an item "abstracted coordinates" added to the list data T1. The item "abstracted coordinates" in the list data T2 shows grid surface coordinate positions of a plurality of contour points corresponding to vertexes of a figure (polygon) formed by a contour abstracted by the process at step S4 in FIG. 3. In other words, when the arithmetic unit 21a abstracts a contour of each structural object extracted by the process at step S2 in FIG. 3, the arithmetic unit 21a performs a process to obtain each coordinate value of abstracted coordinates in the list data T2 based on respective coordinate values included in extracted coordinates in the list data T1. Note that the following explanation is based on the assumption that X coordinate values defining positions of abstracted coordinates in a lateral direction on a grid surface become larger toward the right side from the left side on the grid surface and Y coordinate values defining positions of abstracted coordinates in a vertical direction on the grid surface become larger toward the lower side from the upper side on the grid surface.

The arithmetic unit 21a performs processes to correct a contour line corresponding to a side of a figure (polygon) formed by a contour abstracted by the process at step S4 in FIG. 3 (step S5 in FIG. 3).

Figure 6A:
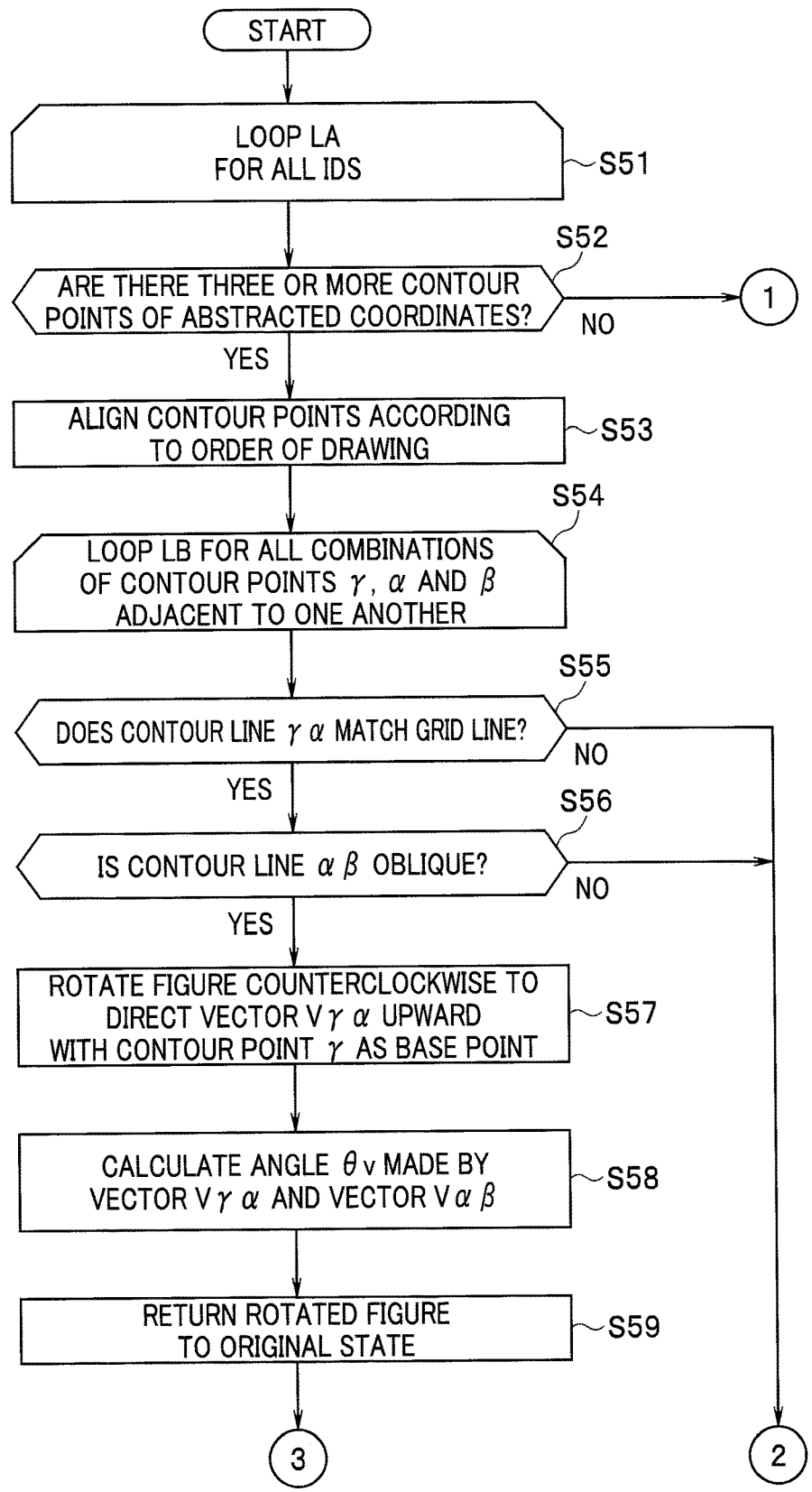
FIG. 6A is a flowchart showing a specific example of processes carried out in the information presentation device according to the embodiment.
Figure 6B:
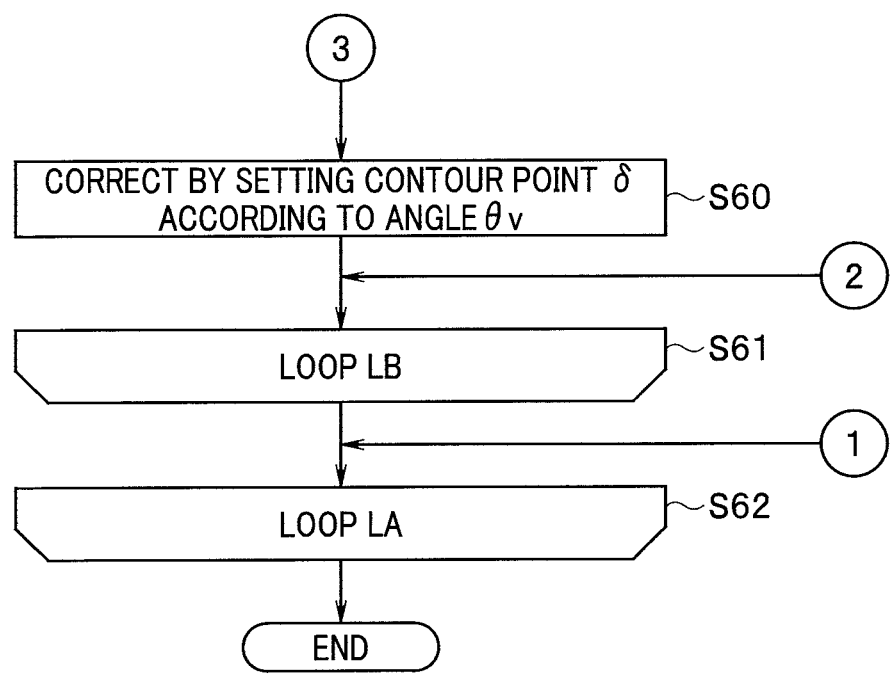
FIG. 6B is a flowchart showing processes continued from FIG. 6A.

Herein, a specific example of the processes performed at step S5 in FIG. 3 is explained with reference to FIG. 6, etc. FIG. 6A is a flowchart partially showing a specific example of processes carried out in the information presentation device according to the embodiment. FIG. 6B is a flowchart showing processes continued from FIG. 6A.

The arithmetic unit 21a starts a loop LA process that is a process to correct a contour line for each contour to which an ID number is given in the list data T2 (step S51 in FIG.

6A). Note that the following explanation is based on a case example where a P-th contour is a subject of the loop LA process among contours with respective ID numbers included in the list data T2.

The arithmetic unit 21a refers to the list data T2 to judge whether the P-th contour includes three or more contour points of abstracted coordinates (step S52 in FIG. 6A).

When a judgment result that the P-th contour does not include three or more contour points of abstracted coordinates is obtained (S52: NO), the arithmetic unit 21a continuously performs a process at step S62 in FIG. 6B to be described later. When a judgment result that the P-th contour includes five or more contour points of abstracted coordinates (S52: YES), the arithmetic unit 21a continuously performs a process at step S53 in FIG. 6A to be described later.

The arithmetic unit 21a performs a process to align coordinate positions of respective contour points included in abstracted coordinates of the P-th contour in a clockwise order of drawing (step S53 in FIG. 6A), followed by using adjacent contour points γ, α and β in the P-th contour to perform a loop LB process that is a process to correct a contour line αβ connecting the contour points α and β (step S54 in FIG. 6A). Note that each of the contour points γ, α and β is selected in the order as aligned by the process at step S53 in FIG. 6A (clockwise in the P-th contour).

The arithmetic unit 21a judges whether a contour line γα matches either one of the grid lines in the two directions orthogonal to each other (in the vertical direction and the lateral direction) on the grid surface (step S55 in FIG. 6A).

When a judgment result that the contour line γα corresponds to either one of the vertical contour line matching the grid line in the vertical direction or the horizontal contour line matching the grid line in the lateral direction is obtained (S55: YES), the arithmetic unit 21a continuously performs a process at step S56 in FIG. 6A to be described later. When a judgment result that the contour line γα is an oblique contour line deviating from both grid lines in both the vertical and lateral directions is obtained (S55: NO), the arithmetic unit 21a continuously performs a process at step S61 in FIG. 6B to be described later.

More specifically, when it is detected that X coordinate values of the contour points γ and α of abstracted coordinates in the P-th contour match each other, the arithmetic unit 21a obtains a judgment result that the contour line γα matches a grid line in the vertical direction. When it is detected that Y coordinate values of the contour points γ and α of abstracted coordinates in the P-th contour match each other, the arithmetic unit 21a obtains a judgment result that the contour line γα matches a grid line in the lateral direction. Additionally, when the X coordinate values of the contour points γ and α of abstracted coordinates in the P-th contour do not match each other and the Y coordinate values of the contour points γ and α do not match each other, the arithmetic unit 21a obtains a judgment result that the contour line γα is an oblique contour line.

The arithmetic unit 21a judges whether the contour line αβ is an oblique contour line deviating from both grid lines in the two directions orthogonal to each other (in the vertical direction and the lateral direction) or not (step S56 in FIG. 6A).

When a judgment result that the contour line αβ is an oblique contour line is obtained (S56: YES), the arithmetic unit 21a continuously performs a process at step S57 in FIG. 6A to be described later. When a judgment result that the contour line αβ corresponds to either one of a vertical contour line matching a grid line in the vertical direction or a horizontal contour line matching a grid line in the lateral direction is obtained (S56: NO), the arithmetic unit 21a continuously performs a process at step S61 in FIG. 6B to be described later.

More specifically, when it is detected that X coordinate values of the contour points α and β of abstracted coordinates in the P-th contour do not match each other and Y coordinate values of the contour points α and β do not match each other, the arithmetic unit 21a obtains a judgment result that the contour line αβ is an oblique contour line. When it is detected that the X coordinate values of the contour points α and β of abstracted coordinates in the P-th contour match each other, the arithmetic unit 21a obtains a judgment result that the contour line αβ matches a grid line in the vertical direction. Additionally, when it is detected that the Y coordinate values of the contour points α and β of abstracted coordinates in the P-th contour match each other, the arithmetic unit 21a obtains a judgment result that the contour line αβ matches a grid line in the lateral direction.

The arithmetic unit 21a performs a process to rotate a figure formed by each contour line of the p-th contour counterclockwise with the contour point γ as a base point so that a vector Vγα showing a direction of a route from the contour point γ to the contour point α in the P-th contour is directed upward (step S57 in FIG. 6A).

More specifically, in a case as an example where it is detected that the vector Vγα faces to the right, namely, the X coordinate value of the contour point γ is less than the X coordinate value of the contour point α in abstracted coordinates in the P-th contour and the Y coordinate value of the contour point γ is equal to the Y coordinate value of the contour point α, the arithmetic unit 21a rotates the figure formed by each contour line of the P-th contour counterclockwise by 90 degrees with the contour point γ as a base point.

Additionally, in a case as an example where it is detected that the vector Vγα faces downward, namely, the X coordinate value of the contour point γ is equal to the X coordinate value of the contour point α in the abstracted coordinates in the P-th contour and the Y coordinate value of the contour point γ is less than a Y coordinate value of the contour point α, the arithmetic unit 21a rotates the figure formed by each contour line of the P-th contour counterclockwise by 180 degrees with the contour point γ as a base point.

Also, in a case as an example where the it is detected that the vector Vγα faces to the left, namely, the X coordinate value of the contour point γ is greater than the X coordinate value of the contour point α in the abstracted coordinates in the P-th contour and the Y coordinate value of the contour point γ is equal to the Y coordinate value of the contour point α, the arithmetic unit 21a rotates the figure formed by each contour line of the P-th contour counterclockwise by 270 degrees with the contour point γ as a base point.

Further, in a case as an example where it is detected that the vector Vγα faces upward, namely, the X coordinate value of the contour point γ is equal to the X coordinate value of the contour point α in the abstracted coordinates in the P-th contour and the Y coordinate value of the contour point γ is greater than the Y coordinate value of the contour point α, the arithmetic unit 21a rotates the figure formed by each contour line of the P-th contour counterclockwise by 360 degrees with the contour point γ as a base point. Note that in a case where the vector Vγα facing upward is detected, the arithmetic unit 21a does not rotate the figure formed by each contour lines of the P-th contour and the process at step S59 in FIG. 6A may be skipped.

The arithmetic unit 21*a* calculates an angle θv made by the vector Vγα and a vector Vαβ showing a direction of a route from the contour point α to the contour point β in the rotated P-th contour obtained by the process at step S57 in FIG. 6A (step S58 in FIG. 6A), followed by performing a process to return the rotated P-th contour to the original state (the state before performing the process at step S57 in FIG. 6A) (step S59 in FIG. 6A).

The arithmetic unit 21*a* performs a process to set a contour point δ corresponding to the angle θv calculated at step S58 in FIG. 6A in the middle of the route from the contour point α to the contour point β in order to correct the oblique contour line αβ included in the (unrotated) P-th contour provided after performing the process at step S59 in FIG. 6A (step S60 in FIG. 6B), followed by continuously perform a process at step S61 in FIG. 6B to be described later.

Figure 7:
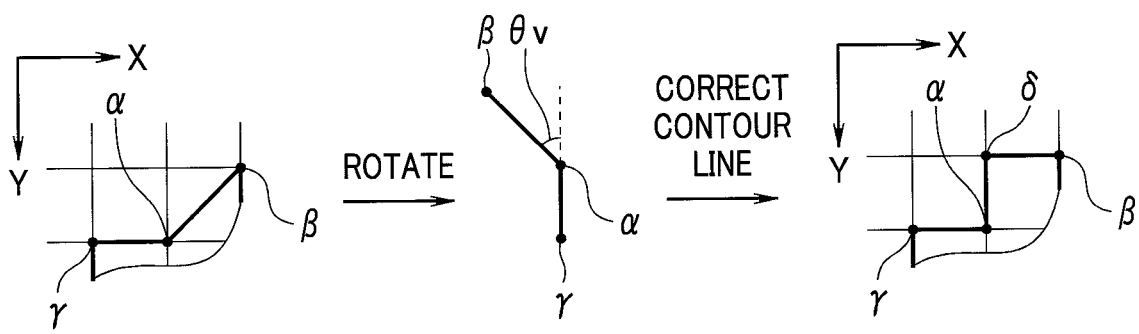
FIG. 7 is a diagram to explain an example of processes to correct a contour line of an abstracted contour.

More specifically, in a case as an example where the angle θv is greater than 0 degrees and 90 degrees or less as shown in FIG. 7, the arithmetic unit 21*a* makes a correction by adding a new contour point δ having the X coordinate value of the contour point α and the Y coordinate value of the contour point β in the middle of the route from the contour point α to the contour point β outside the P-th contour, so that the oblique contour line αβ included in the (unrotated) P-th contour provided before performing the process at step S59 in FIG. 6A becomes a continuous line having an contour line αδ matching a grid line in the vertical direction on the grid surface and a contour line δβ matching a grid line in the lateral direction on the grid surface. Note that the contour point δ added when the angle θv is greater than 0 degrees and 90 degrees or less may have, for example, the Y coordinate value of the contour point α and the X coordinate value of the contour point β as long as the contour point δ is located outside the P-th contour. FIG. 7 is a diagram to explain an example of processes to correct a contour line of an abstracted contour.

Figure 8:
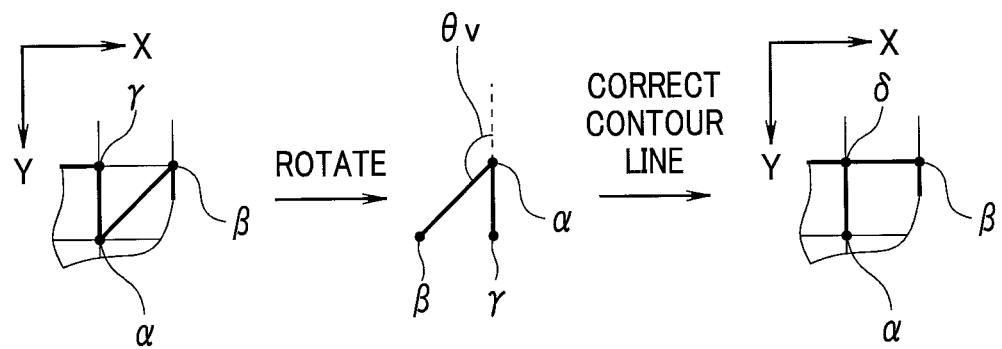
FIG. 8 is a diagram to explain an example of processes to correct a contour line of an abstracted contour.

Also, in a case as an example where the angle θv is greater than 90 degrees and 180 degrees or less as shown in FIG. 8, the arithmetic unit 21*a* makes a correction by setting the contour point δ having the X coordinate value of the contour point γ and the Y coordinate value of the contour point γ in the middle of the route from the contour point α to the contour point β, so that the oblique contour line αβ included in the (unrotated) P-th contour provided before performing the process at step S59 in FIG. 6A becomes a continuous line having the contour line αδ matching the grid line in the vertical direction on the grid surface and the contour line δβ matching the grid line in the lateral direction on the grid surface. In other words, when the angle θv is greater than 90 degrees and 180 degrees or less, the arithmetic unit 21*a* sets a coordinate position of the contour point γ as a coordinate position of the contour point δ. FIG. 8 is a diagram to explain an example of processes to correct a contour line of an abstracted contour.

Figure 9:
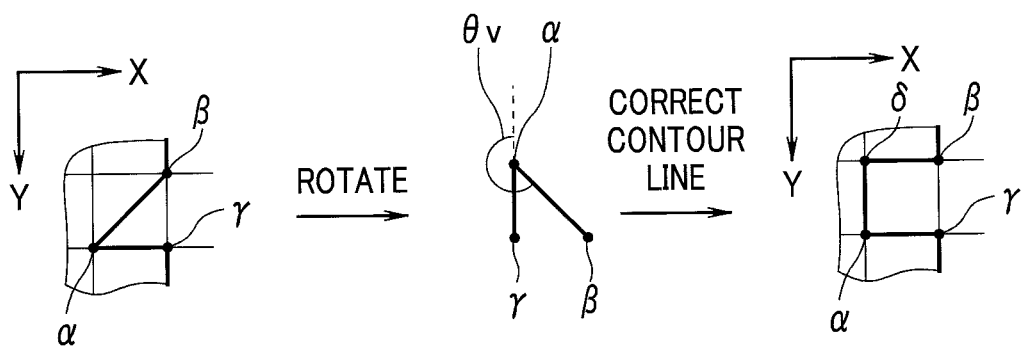
FIG. 9 is a diagram to explain an example of processes to correct a contour line of an abstracted contour.

Further, in a case as an example where the angle θv is greater than 180 degrees and 270 degrees or less as shown in FIG. 9, the arithmetic unit 21*a* makes a correction by adding a new contour point δ having the X coordinate value of the contour point α and the Y coordinate value of the contour point β in the middle of the route from the contour point ac to the contour point β outside the P-th contour, so that the oblique contour line αβ included in the (unrotated) P-th contour provided before performing the process at step S59 in FIG. 6A becomes a continuous line having the contour line αδ matching the grid line in the vertical direction on the grid surface and the contour line δβ matching the grid line in the lateral direction on the grid surface. Note that the contour point δ added when the angle θv is greater than 180 degrees and 270 degrees or less may have, for example, the Y coordinate value of the contour point α and the X coordinate value of the contour point β as long as the contour point δ is located outside the P-th contour. FIG. 9 is a diagram to explain an example of processes to correct a contour line of an abstracted contour.

Figure 10:
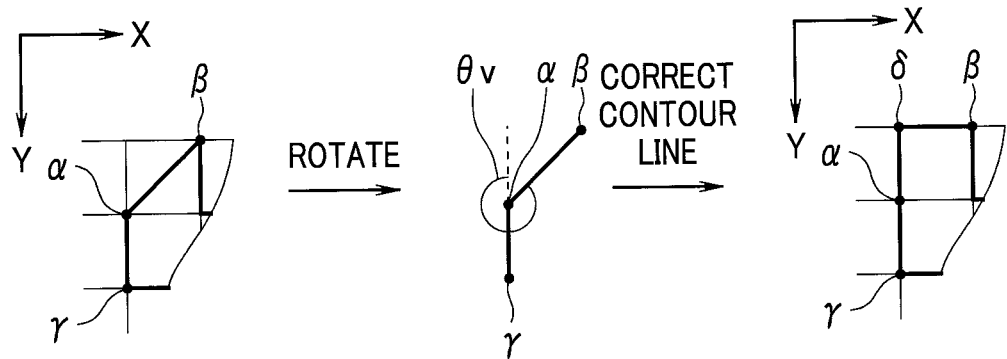
FIG. 10 is a diagram to explain an example of processes to correct a contour line of an abstracted contour.

Further, in a case as an example where the angle θv is greater than 270 degrees and 360 degrees or less as shown in FIG. 10, the arithmetic unit 21*a* makes a correction by adding a new contour point δ having the X coordinate value of the contour point α and the Y coordinate value of the contour point β in the middle of the route from the contour point α to the contour point β outside the P-th contour, so that the oblique contour line αβ included in the (unrotated) P-th contour provided before performing the process at step S59 in FIG. 6A becomes a continuous line having the contour line αδ matching the grid line in the vertical direction on the grid surface and the contour line δβ matching the grid line in the lateral direction on the grid surface. Note that the contour point δ added when the angle θv is greater than 270 degrees and 360 degrees or less may have, for example, the Y coordinate value of the contour point α and the X coordinate value of the contour point β as long as the contour point δ is located outside the P-th contour. FIG. 10 is a diagram to explain an example of processes to correct a contour line of an abstracted contour.

Namely, according to the processes from step S57 to step S59 in FIG. 6A and the process at step S60 in FIG. 6B, the arithmetic unit 21*a* performs a process to make a correction so that an oblique contour line deviating from both grid lines of two directions orthogonal to each other (in the vertical direction and the lateral direction) on a grid surface becomes a continuous line having a first contour line matching a grid line of a first direction out of the grid lines of the two directions, and having a second contour line matching a grid line of a second direction out of the grid lines of the two directions.

The arithmetic unit 21*a* performs a process to terminate the loop LB (step S61 in FIG. 6B). More specifically, when the process applied to all the combinations of the adjacent contour point γ, α and β in the P-th contour is not completed, the arithmetic unit 21*a* returns to step S54 in FIG. 6A to perform the process of the loop LB again. Besides, when the process applied to all the combinations of the adjacent contour point γ, α and β in the P—the contour is completed, the arithmetic unit 21*a* finishes the process of the loop LB and continuously performs a process at step S62 in FIG. 6B to be described later.

The arithmetic unit 21*a* performs a process to terminate the loop LA (step S62 in FIG. 6B). More specifically, when there is any unprocessed contour other than the P-th contour among contours to which ID numbers are given in the list data T2, the arithmetic unit 21*a* returns to step S51 in FIG. 6A and repeats the process of the loop LA again. When there is no unprocessed contour other than the P-th contour among the contours to which ID numbers are given in the list data T2, the arithmetic unit 21*a* finishes the process of the loop LA and finishes a series of the processes in FIG. 6A and FIG. 6B.

In other words, the arithmetic unit 21*a* having a function as a contour correction unit makes a correction so that, among the contour lines to constitute a contour abstracted by the process at step S4 in FIG. 3, a contour line deviating from the grid lines in the two directions orthogonal to each other on the grid surface matches a grid line in at least one of the grid lines in the two directions.

In a case as an example where each contour abstracted by the process at step S4 in FIG. 3 is displayed on the output device 25, visibility may be reduced due to diversity of the contour shapes. However, the present embodiment makes a correction so that a contour line of each contour abstracted by the process at step S4 in FIG. 3 matches the grid lines in the two directions orthogonal to each other (in the vertical direction and the lateral direction) on the grid surface. Thus, visibility reduction in displaying each contour in the output device 25 is prevented and aesthetic properties in displaying each contour in the output device 25 are improved.

The arithmetic unit 21a performs a process to complement information that is defective due to the process for abstraction at step S4 in FIG. 3, using the list data T2 that has been updated according to the result of the process at step S5 in FIG. 3 (step S6 in FIG. 3).

Figure 11:
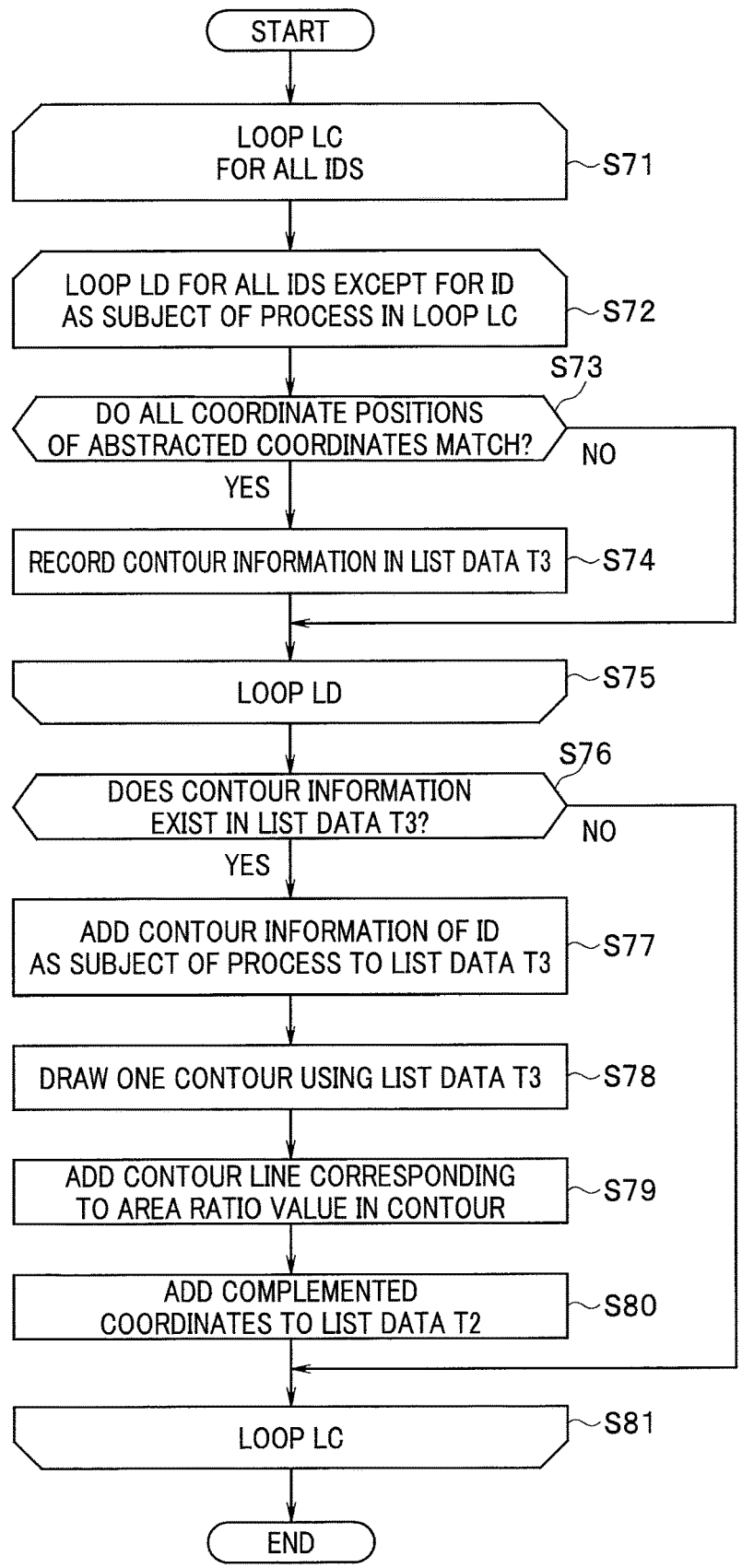
FIG. 11 is a flowchart showing a specific example of processes carried out in the information presentation device according to the embodiment.

Herein, a specific example of processes carried out at step S6 in FIG. 3 is explained with reference to FIG. 11, etc. FIG. 11 is a flowchart showing a specific example of processes carried out in the information presentation device according to the embodiment.

The arithmetic unit 21a starts a loop LC process that is a process to specify the presence or absence of defective information resulting from contour abstraction for each contour to which an ID number is given in the list data T2 (step S71 in FIG. 11). Note that the following explanation is based on a case example where a Q-th contour is a subject of the loop LC process among contours with respective ID numbers included in the list data T2.

The arithmetic unit 21a starts a loop LD process that is a process to specify the presence or absence of defective information resulting from abstraction of the Q-th contour (step S72 in FIG. 11). Note that the following explanation is based on a case example where an R-th contour numbered differently from the Q-th number is a subject of the loop LD process among the contours with the respective ID numbers included in the list data T2.

The arithmetic unit 21a judges whether all the coordinate positions of abstracted coordinates in the R-th contour match all the coordinate positions of abstracted coordinates in the Q-th contour or not (step S73 in FIG. 11).

When a judgment result that all the coordinate positions of abstracted coordinates in the R-th contour match all the coordinate positions of abstracted coordinates in the Q-th contour is obtained (S73: YES), the arithmetic unit 21a records information of the R-th contour in list data T3 to be described later (step S74 in FIG. 11), followed by continuously performing a process at step S75 in FIG. 11 to be described later. When a judgment result that there is at least one coordinate position of the abstracted coordinates in the R-th contour which does not match any of the coordinate positions of abstracted coordinates in the Q-th contour is obtained, the arithmetic unit 21a (skips the process at step S74 in FIG. 11 and) continuously performs a process at step S75 in FIG. 11 to be described later.

The arithmetic unit 21a performs a process to terminate the loop LD (step S75 in FIG. 11). More specifically, when there is any unprocessed contour other than the R-th contour among the respective contours to which ID numbers different from theQ-th number are given in the list data T2, the arithmetic unit 21a returns to step S72 in FIG. 11 and performs the process of the loop LD again. When there is no unprocessed contour other than the R-th contour among the respective contours to which ID numbers different from the Q-th number are given in the list data T2, the arithmetic unit 21a finishes the process of the loop LD and continuously performs a process at step S76 in FIG. 11 to be described later.

The arithmetic unit 21a judges whether there is contour information of one or more ID number(s) in the list data T3 or not (step S76 in FIG. 11).

When a judgment result that there is no contour information in the list data T3 is obtained (S76: NO), the arithmetic unit 21a continuously performs a process at step S81 in FIG. 11 to be described later. When a judgment result that there is contour information in the list data T3 is obtained (S76: YES), the arithmetic unit 21a adds information of the Q-th contour to the list data T3 (step S77 in FIG. 11), followed by continuously performing a process at step S78 in FIG. 11 to be described later.

Herein, when the process at step S77 in FIG. 11 is performed, the list data T3 which is, for example, as shown in FIG. 12 is obtained. FIG. 12 is a diagram to explain an example of list data obtained by the processes carried out in the information presentation device according to the embodiment.

The list data T3 shown in FIG. 12 is configured as data comprising values of abstracted coordinates and an area ratio of the R-th contour recorded by the process at step S74 in FIG. 11, and values of abstracted coordinates and an area ratio of the Q-th contour added by the process at step S77 in FIG. 11. In other words, the list data T3 obtained immediately after performing the process at the S74 in FIG. 11 does not include information of the Q-th contour but includes information of one or more contour meeting judgement conditions of the process at step S73 in FIG. 11.

Note that values of the Q-th abstracted coordinates and area ratio included in the list data T3 are information extracted from the same items of the Q-th contour included in the list data T2. Values of the R-th abstracted coordinates and area ratio included in the list data T3 are also information extracted from the same items of the R-th contour included in the list data T2. Additionally, when there is no contour that meets judgement conditions of the process at step S73 in FIG. 11, namely, when there is no defective contour resulting from abstraction of the Q-th contour, the list data T3 that comprises, for example, only a column of item names ("ID," "abstracted coordinates" and "area ratio") is obtained as a processing result of the loop LD process. Note that the following explanation is based on the list data T3 as shown in FIG. 12, namely, a case example where there is only the R-th contour (one contour) that is a defective contour resulting from abstraction of the Q-th contour.

The arithmetic unit 21a performs a process to draw a contour with the use of the list data T3 obtained by the process at step S77 in FIG. 11 (step S78 in FIG. 11). More specifically, the arithmetic unit 21a performs a process to draw, on a grid surface, a contour corresponding to abstracted coordinates of either the Q-th ID number or the R-th ID number included in the list data T3 shown in FIG. 12. In other words, the arithmetic unit 21a performs a process to draw, on a grid surface, one contour corresponding to abstracted coordinates of any one of a plurality of ID numbers included in the list data T3 at step S78 in FIG. 11.

The arithmetic unit 21a performs a process to add, to the inside of the one contour drawn by the process at step S78 in FIG. 11, a new contour line corresponding to an area ratio value of each ID number included in the list data T3, in the order starting from a smaller ID number (step S79 in FIG. 11). More specifically, the arithmetic unit 21a performs a process based on the Q-th area ratio value and the R-th area ratio value included in the list data T3 shown in FIG. 12, for example, divide the one contour drawn by the process at step S78 in FIG. 11 into 4:1 and add, to the inside of the contour, a new contour line (separation line) that matches a grid line in the vertical direction or in the lateral direction on the grid surface.

The arithmetic unit 21a obtains, as coordinate positions of complementary coordinates, coordinate positions of a plurality of contours formed by the contour line of one contour drawn by the process at step S78 in FIG. 11 and the contour line added to the inside of the one contour by the process at step S79 in FIG. 11. The arithmetic unit 21a also performs a process to add coordinate positions of complementary coordinates obtained as stated above to the list data T2 (step S80 in FIG. 11). Then, the arithmetic unit 21a obtains, for example, list data T4 as shown in FIG. 13 as a result of the process at step S80 in FIG. 11. FIG. 13 is a diagram to explain an example of list data obtained by the processes carried out in the information presentation device according to the embodiment.

The list data T4 is configured as data obtained by adding an item "complementary coordinates" to the list data T2. The item "complementary coordinates" in the list data T4 shows coordinate positions of complementary coordinates added by the process at step S80 in FIG. 11. Note that an ID number for which a judgment result of absence of contour information in the list data T3 has been obtained by the process at step S76 in FIG. 11 is indicated by "-" in the item "complementary coordinates" of the list data T4 in FIG. 13. In other words, the list data T4 is generated during a period in which a contour of an initial ID number included in the list data T2 is a subject of the loop LC process.

The arithmetic unit 21a performs a process to terminate the loop LC (step S81 in FIG. 11). More specifically, when there is any unprocessed contour other than the Q-th contour among respective contours to which ID numbers are given in the list data T4, the arithmetic unit 21a returns to step S71 in FIG. 11 to perform the process of the loop LC again. When there is no unprocessed contour other than the Q-th contour among respective contours to which ID numbers are given in the list data T4, the arithmetic unit 21a finishes the process of the loop LC and finishes a series of the processes in FIG. 11.

In other words, when a plurality of contours extracted by the process at step S2 in FIG. 3 is integrated into one contour by the process at step S4 in FIG. 3, the arithmetic unit 21a having a function as a contour information complementing unit performs a process to add, to the inside of the one contour, according to area ratios of the plurality of contours, visual information to enable identification of each of the plurality of contours on the grid surface. Additionally, when a plurality of contours extracted by the process at step S2 in FIG. 3 is integrated into one contour by the process at step S4 in FIG. 3, the arithmetic unit 21a performs a process to add, to the inside of the one contour, according to area ratios and the number of the plurality of contours, a new contour line that matches a grid line in any one direction of the grid lines in the two directions orthogonal to each other on the grid surface.

Figure 14:
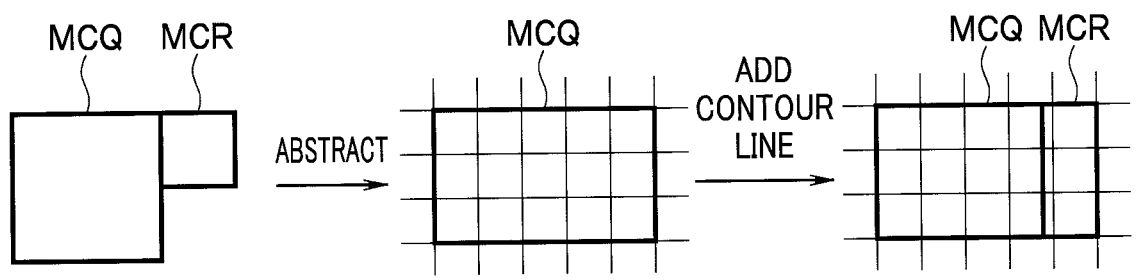
FIG. 14 is a diagram to explain an outline of processes to complement defective information resulting from contour abstraction.

In a case as an example where contours of adjacent two facilities MCQ and MCR are extracted by the process at step S2 in FIG. 3, due to the process for abstraction at step S4 in FIG. 3, there may be a phenomenon such that the contour of the facility MCR having a relatively small area is integrated (or included) into the contour of the facility MCQ having a relatively large area (see FIG. 14). However, the present embodiment adds a contour line corresponding to area ratios of the facilities MCQ and MCR (see FIG. 14) so as to complement defective information of the facility MCR resulting from contour abstraction of the facility MCQ, whereby it is possible to prevent visibility reduction in displaying each contour abstracted by the process at step S4 in FIG. 3 in the output device 25. FIG. 14 is a diagram to explain an outline of processes to complement defective information resulting from contour abstraction.

Note that according to the present embodiment, the process at step S6 may be provided without passing through the process for contour line correction at step S5 in FIG. 3, namely, immediately after the process at step S4 in FIG. 3.

Also, according to the present embodiment, the process at step S7 may be provided without passing through the process for complement of defective information at step S6 in FIG. 3, namely, immediately after the process at step S5 in FIG. 3.

Further, according to the present embodiment, step S79 in FIG. 11 is not limited to the process to add a new contour line according to area ratios and the number of contours included in the list data T3 but may have a process to, for example, distinguish respective contours with the use of different colors or patterns according to area ratios and the number of the contours.

Further, according to the present embodiment, a new contour line (separation line) added to the inside of the contour by the processes in FIG. 11 may not need to match a grid line in any one of the directions of the grid lines in the two directions orthogonal to each other on the grid surface. More specifically, according to the present embodiment, as long as a new contour line (separation line) added to the inside of the contour through the processes in FIG. 11 is parallel to a grid line in any one direction of the grid lines in the two directions orthogonal to each other on a grid surface, the new contour line may deviate from both grid lines in the two directions (see FIG. 14).

Further, according to the present embodiment, in the process at step S79 in FIG. 11, a process may be performed to add, for example, a sequence of points formed by arranging a plurality of points linearly in place of the contour line.

Figure 15:
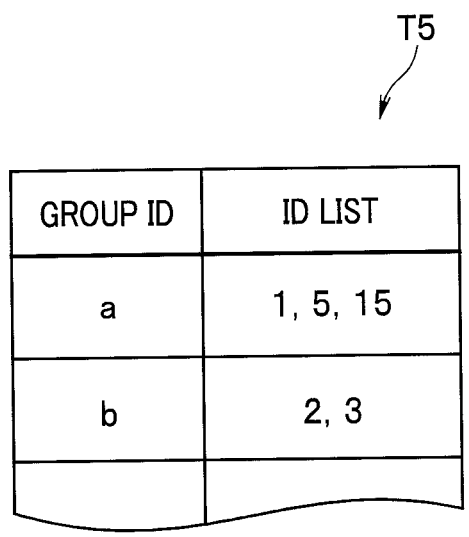
FIG. 15 is a diagram to explain an example of list data that can be used for processes carried out in the information presentation device according to the embodiment.

Further, according to the present embodiment, application of the process to determine the necessity of adding a contour line is not limited to contours of all the ID numbers included in the list data T2 but may be applied to, for example, only contours of some of the ID numbers included in the list data T2. More specifically, the arithmetic unit 21a may judge, for example, between step S75 and step S76 in FIG. 11, with reference to list data T5 as shown in FIG. 15, whether the process to determine the necessity of adding a contour line should be applied to the Q-th contour or not. FIG. 15 is a diagram to explain an example of list data available for use in the processes carried out in the information presentation device according to the embodiment.

An item "group ID" in the list data T5 shows a unique value given to each one of groups having contour(s) of one or more ID numbers. An item "ID list" in the list data T5 shows a contour with an ID number belonging to each "group ID."

In other words, the arithmetic unit 21a may perform the process at step S76 in FIG. 11 (or the processes from step S76 to step S80 in FIG. 11) only when, for example, the Q-th contour is included in any one of all the ID lists included in the list data T5. The arithmetic unit 21a may also perform the process at step S76 in FIG. 11 (or the processes from step S76 to step S80 in FIG. 11) only when, for example, the Q-th contour is included in the ID list of a predetermined group ID included in the list data T5.

The arithmetic unit 21a performs a process to generate a file for display in order to display, in the output device 25, an abstracted image that is an image having each contour drawn on the grid surface by the processes up to step S6 in FIG. 3 (step S7 in FIG. 3). Note that the process at step S7 in FIG. 3 is available for use as appropriate in the form of a file for display such as HTML format and SVG format.

The control unit 21b performs a process to display, in the output device 25, a display image including an abstracted image generated by the process at step S7 in FIG. 3 according to a display file, and an abstraction degree changing UI that is a GUI (graphical user interface) capable of accepting operation by a user for changing the degree of abstraction of the abstracted image (step S8 in FIG. 3).

Figure 16:
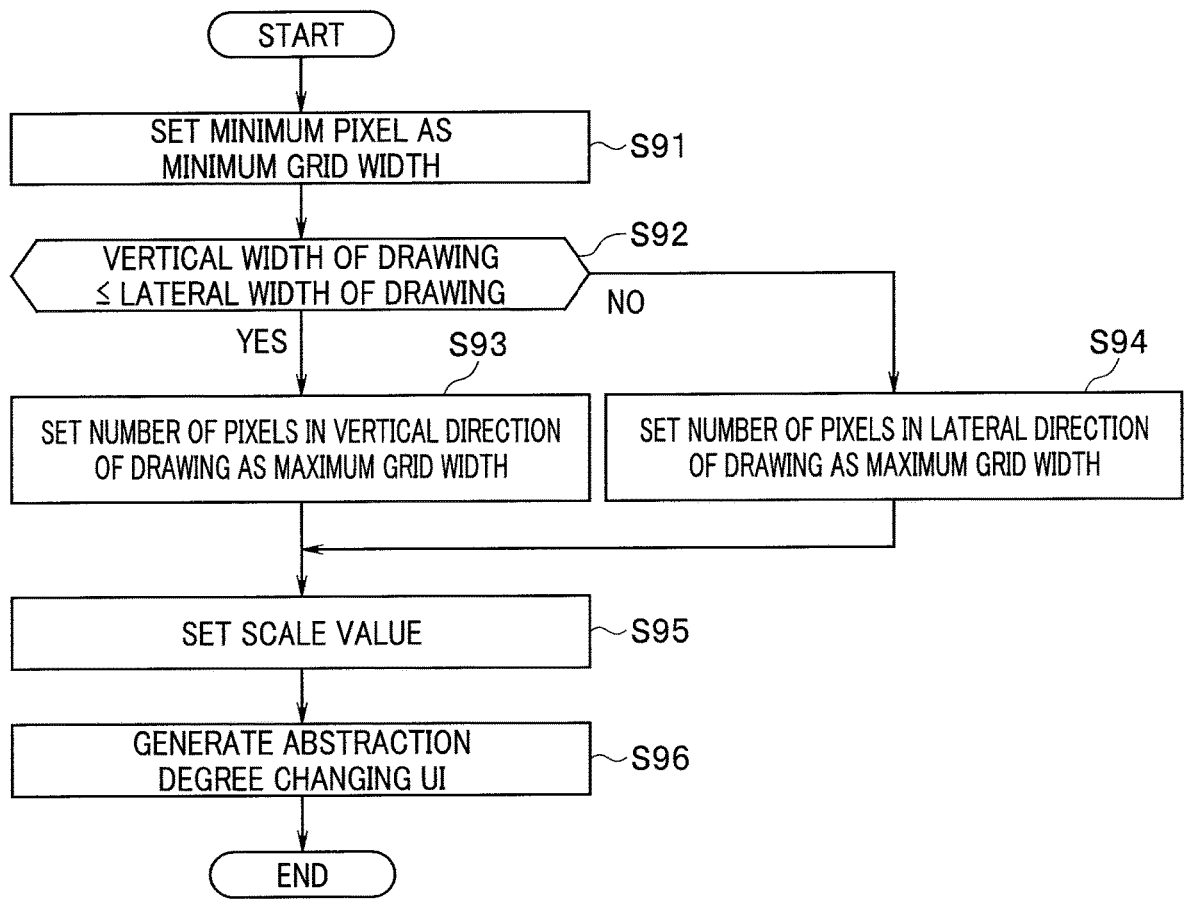
FIG. 16 is a flowchart showing a specific example of processes carried out in the information presentation device according to the embodiment.

Herein, a specific example of processes for generation of the abstraction degree changing UI is explained with reference to FIG. 16. FIG. 16 is a flowchart showing a specific example of processes carried out in the information presentation device according to the embodiment.

The control unit 21b performs a process to set, as a minimum grid width Gmin of the abstraction degree changing UI, a minimum pixel (e.g., one pixel) to constitute a display image in the output device 25 (step S91 in FIG. 16).

The control unit 21b judges whether drawing image data read at step S1 in FIG. 3 has a vertical width that is equal to or less than a lateral width or not (step S92 in FIG. 16).

When a judgment result that drawing image data read at step S1 in FIG. 3 has a vertical width that is equal to or less than a lateral width is obtained (S92: YES), the control unit 21b performs a process to set the number of pixels in a vertical direction corresponding to the vertical width as a maximum grid width Gmax of the abstraction degree changing UI (step S93 in FIG. 16). When a judgment result that drawing image data read at step S1 in FIG. 3 has a vertical width that is greater than a lateral width is obtained (S92: NO), the control unit 21b performs a process to set the number of pixels in a lateral direction corresponding to the lateral width as the maximum grid width Gmax of the abstraction degree changing UI (step S94 in FIG. 16). Note that the maximum grid width Gmax of the abstraction degree changing UI in the present embodiment may not need to be set according to the number of pixels of either the vertical width or the lateral width, whichever is the shorter, of the drawing image data read at step S1 in FIG. 3.

The control unit 21b performs a process to set, as a scale value corresponding to the number of pixels of a grid width that can be changed in the abstraction degree changing UI, the number of pixels corresponding to each of the minimum grid width Gmin, the maximum grid width Gmax, and one or more grid widths pertaining to a range of more than the minimum grid width Gmin and less than the maximum grid width Gmax (step S95 in FIG. 16).

Figure 17:
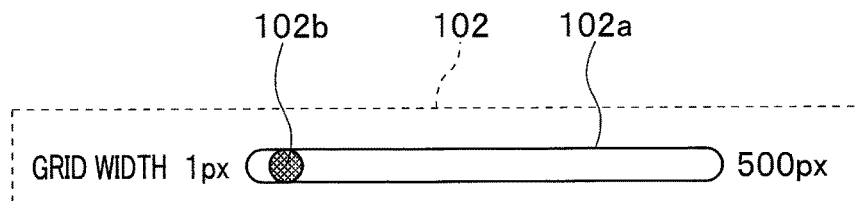
FIG. 17 shows an example of an abstraction degree changing UI generated by the processes carried out in the information presentation device according to the embodiment.

The control unit 21b performs a process to generate, for example, an abstraction degree changing UI 102 as shown in FIG. 17 based on each scale value set at step S95 in FIG. 16 (step S96 in FIG. 16). Note that FIG. 17 shows an example of the abstraction degree changing UI 102 in which the minimum grid width Gmin is set to 1 pixel and the maximum grid width Gmax is set to 500 pixels. FIG. 17 is a diagram showing an example of the abstraction degree changing UI generated by processes carried out in the information presentation device according to the embodiment.

The abstraction degree changing UI 102 is composed of an elongated frame 102a showing a variable range of a grid width from the minimum grid width Gmin to the maximum grid width Gmax, and an operation element 102b operated by a user.

The operation element 102b is configured to be movable along the frame 102a according to an operation in the input device 24 by a user. The operation element 102b is also configured as an interface in which the number of pixels corresponding to one scale value out of respective scale values set by the process at step S95 in FIG. 16 can be set as a grid width of an abstracted image according to the operation in the input device 24 by a user.

Figure 18:
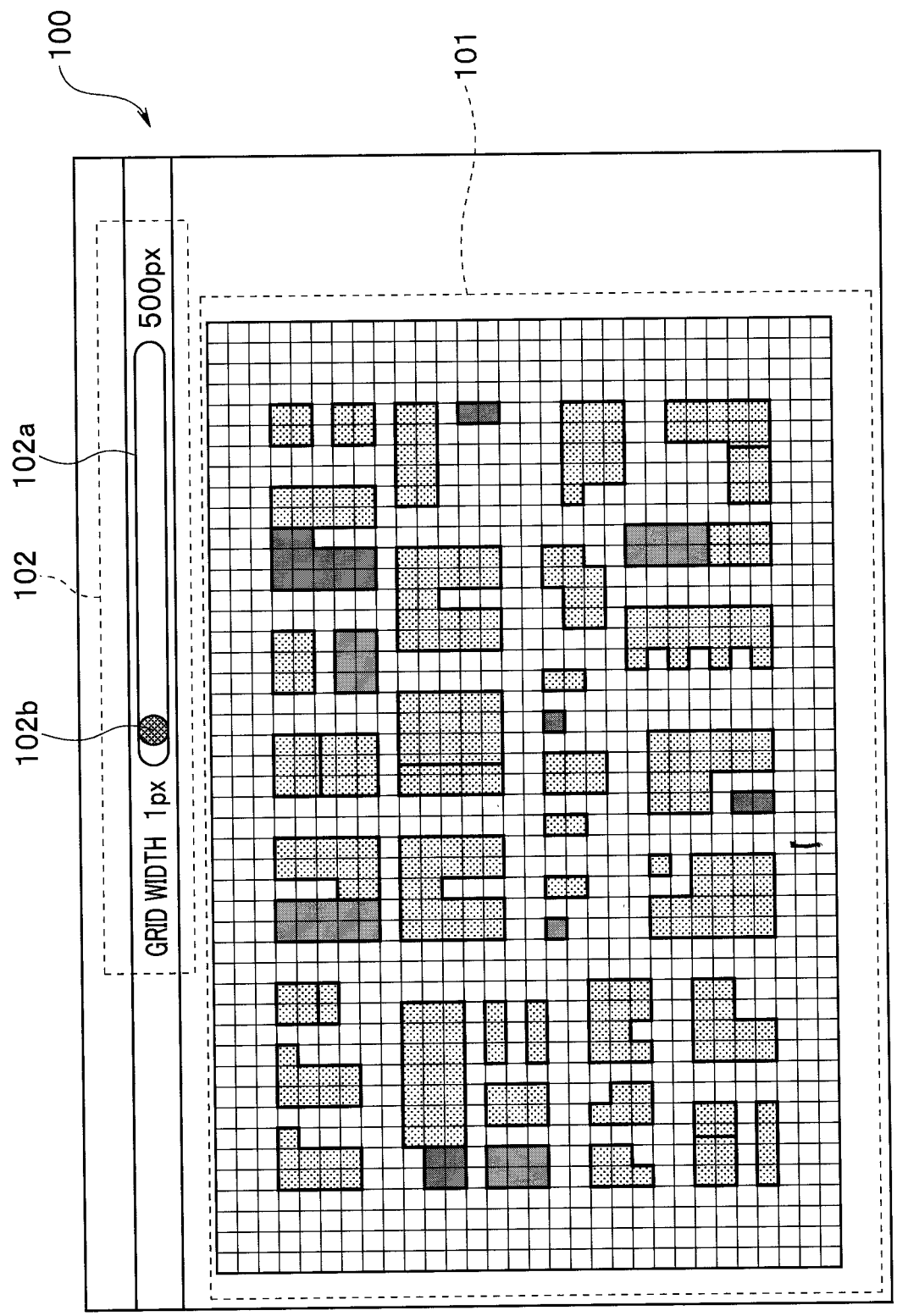
FIG. 18 is an example of a display image that is displayed according to the processes carried out in the information presentation device according to the embodiment.

Then, according to the processes as stated above, as a result of the process at step S8 in FIG. 3, for example, a display image 100 including an abstracted image 101 and the abstraction degree changing UI 102 arranged above the abstracted image 101 are displayed in the output device 25 as shown in FIG. 18. In other words, the control unit 21b having a function as a presentation processing unit generates a graphical user interface capable of accepting the operation by the user in relation to changing an interval between grid lines adjacent to each other on the grid surface, and presents the generated graphical user interface along with abstracted images including respective contours obtained as a result of at least one of the processes of step S5 and step S6 in FIG. 3. Note that, for example, respective facilities installed in a plant in the abstracted image 101 shown in FIG. 18 include contours shown with a dot pattern corresponding to operating facilities and contours filled solidly corresponding to facilities in suspension. FIG. 18 is a diagram showing an example of a display image that is displayed according to the processes carried out in the information presentation device according to the embodiment.

The control unit 21b judges whether an operation for changing the degree of abstraction of the abstracted image 101, namely, an operation to move the operation element 102b of the abstraction degree changing UI 102 from a current position is performed or not in the input device 24 (step S9 in FIG. 3).

When it is detected that the operation for changing the degree of abstraction of the abstracted image 101 is performed (S9: YES), the control unit 21b identifies a changed grid width based on a position of the operation element 102b, and controls the arithmetic unit 21a to perform the processes from step S4 to step S8 in FIG. 3 again on a grid surface having the changed grid width. When it is not possible to detect the operation for changing the degree of abstraction of the abstracted image 101 (S9: NO), the control unit 21b finishes a series of the processes in FIG. 3.

In other words, in the present embodiment, owing to the operation in the abstraction degree changing UI 102, the abstracted image 101 that has been abstracted by a desired degree of abstraction according to a purpose of a user, etc. can be displayed in the output device 25.

As stated above, according to the present embodiment, it is possible to prevent visibility reduction in abstracting and presenting a structural object.

Each function of the information presentation device 11 of the information presentation system 1 in the present embodiment can be configured as a program. For example, it is possible that an auxiliary storage device, not shown, in the computer stores therein programs for respective functions of the information presentation device 11, the CPU 21 reads the stored programs into a main storage device, and the CPU 21 executes the programs read into the main storage device in order to cause the computer to perform the functions of the respective units of the present invention. In other words, the computer in which the programs for the respective functions of the information presentation device 11 of the information presentation system 1 according to the present embodiment are installed can operate as a computer device that carries out the respective functions of the information presentation device 11 of the information presentation system 1 according to the present embodiment.

The above programs can also be provided to the computer in a state of being recorded in a computer readable recording medium. The computer readable recording medium includes an optical disc such as a CD-ROM, a phase change-type optical disc such as a DVD-ROM, a magneto-optical disk such as an MO (magnet optical) disk and an MD (mini disk), a magnetic disk such as a floppy (registered trademark) disk and a removable hard disk, a compact flash (registered trademark), and a memory card such as a smart medium, an SD memory card and a memory stick. A hardware device such as an integrated circuit (IC chip, etc.) designed and configured especially for the purpose of the present invention is also included in the recording medium.

The embodiment explained as the embodiment of the present invention is merely provided as an example and not intended to limit the scope of the present invention. This new embodiment may be implemented in other various modes and may be omitted, replaced or changed variously in a range without deviating from the gist of the invention. The embodiment and modifications thereof are included in the scope and gist of the invention and included in the equivalent extent of the inventions stated in the scope of claims.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An information presentation device comprising:
   a processor configured to:
      extract a contour of each structural object included in data showing a layout of a plurality of structural objects;
      when abstracting a contour of the extracted structural object, perform abstraction processing such that coordinates of vertexes of a figure constituted by a plurality of contour lines obtained by the abstraction processing match coordinates of grid points on a plane grid surface in which grid lines in two directions orthogonal to each other are drawn; and
      correct, among the abstracted contour lines, a contour line deviating from both of the grid lines in the two directions so as to match a grid line in at least one of the two directions of the grid lines in the two directions such that:
         when abstracted coordinates at two points on the contour have different values of a first coordinate and have a same value of a second coordinate, the contour line between the two points is corrected to match a grid line in a first direction of the two directions, and
         when the abstracted coordinates at the two points on the contour have different values of the second coordinate and have a same value of the first coordinate, the contour line between the two points is corrected to match a grid line in a second direction of the two directions.

2. The information presentation device according to claim 1, wherein the processor is further configured to:
      generate a graphical user interface capable of accepting an operation by a user for changing an interval of grid lines adjacent to each other on the grid surface, and
      present the generated graphical user interface along with an abstracted image containing each contour.

3. The information presentation device according to claim 1, wherein the processor is further configured to correct, among the abstracted contour lines, a contour line deviating from both of the grid lines in the two directions so as to become a continuous line comprising a first contour line matching a grid line in the first direction of the grid lines in the two directions and a second contour line matching a grid line in the second direction of the grid lines in the two directions.

4. The information presentation device according to claim 1, wherein
   the first coordinate is an X coordinate,
   the second coordinate is a Y coordinate,
   the first direction is a lateral direction, and
   the second direction is a vertical direction.

5. An information presentation method comprising the steps of:
   extracting a contour of each structural object included in data showing a layout of a plurality of structural objects;
   when abstracting a contour of the extracted structural object, performing abstraction processing such that coordinates of vertexes of a figure constituted by a plurality of contour lines obtained by the abstraction processing match coordinates of grid points on a plane grid surface in which grid lines in two directions orthogonal to each other are drawn; and
   correcting, among the abstracted contour lines, a contour line deviating from both of the grid lines in the two directions so as to match a grid line in at least one of the two directions of the grid lines in the two directions such that:
      when abstracted coordinates at two points on the contour have different values of a first coordinate and have a same value of a second coordinate, the contour line between the two points is corrected to match a grid line in a first direction of the two directions, and
      when the abstracted coordinates at the two points on the contour have different values of the second coordinate and have a same value of the first coordinate, the contour line between the two points is corrected to match a grid line in a second direction of the two directions.

6. A non-transient storage medium storing a computer readable program to execute:
   a process to extract a contour of each structural object included in data showing a layout of a plurality of structural objects;
   a process to, when abstracting a contour of the extracted structural object, perform abstraction processing such that coordinates of vertexes of a figure constituted by a plurality of contour lines obtained by the abstraction processing match coordinates of grid points on a plane grid surface in which grid lines in two directions orthogonal to each other are drawn; and
   a process to correct, among the abstracted contour lines, a contour line deviating from both of the grid lines in the two directions so as to match at least a grid line in at least one of the two directions of the grid lines in the two directions such that:

when abstracted coordinates at two points on the contour have different values of a first coordinate and have a same value of a second coordinate, the contour line between the two points is corrected to match a grid line in a first direction of the two directions, and when the abstracted coordinates at the two points on the contour have different values of the second coordinate and have a same value of the first coordinate, the contour line between the two points is corrected to match a grid line in a second direction of the two directions.

* * * * *